United States Patent
Jayakumar et al.

(10) Patent No.: US 12,019,604 B2
(45) Date of Patent: *Jun. 25, 2024

(54) GENERATING CONTEXT TREE DATA BASED ON A TAILORED DATA MODEL

(71) Applicant: Open Text Corporation, Waterloo (CA)

(72) Inventors: Muthukumarappa Jayakumar, Mountain House, CA (US); Satyapal P. Reddy, San Ramon, CA (US); Ravikumar Meenakshisundaram, Pleasanton, CA (US)

(73) Assignee: OPEN TEXT CORPORATION, Waterloo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/149,306

(22) Filed: Jan. 3, 2023

(65) Prior Publication Data

US 2023/0148285 A1 May 11, 2023

Related U.S. Application Data

(63) Continuation of application No. 16/418,479, filed on May 21, 2019, now Pat. No. 11,567,918, which is a
(Continued)

(51) Int. Cl.
*G06F 16/22* (2019.01)
*G06F 16/21* (2019.01)
(Continued)

(52) U.S. Cl.
CPC ........ *G06F 16/2246* (2019.01); *G06F 16/219* (2019.01); *G06F 16/2428* (2019.01);
(Continued)

(58) Field of Classification Search
CPC .............. G06F 16/2246; G06F 16/219; G06F 16/2428; G06F 16/245; G06F 16/28; G06F 16/288
(Continued)

(56) References Cited

U.S. PATENT DOCUMENTS

| | | | |
|---|---|---|---|
| 6,473,707 B1 * | 10/2002 | Grey | G06F 11/263 702/123 |
| 7,043,481 B2 * | 5/2006 | Mullins | G06F 9/4493 703/2 |

(Continued)

OTHER PUBLICATIONS

Stefanidis et al., "A Context-Aware Preference Database System", J. Pervasive Comput. & Comm. 1 (1), Mar. 2005, pp. 1-12. (Year: 2005).*

*Primary Examiner* — Phuong Thao Cao
(74) *Attorney, Agent, or Firm* — SPRINKLE IP LAW GROUP

(57) ABSTRACT

A system for providing context tree based on data model is disclosed. The system comprises an interface, a processor, and a memory. The interface is configured to receive a data model entry point, and to receive one or more context filters. The processor is configured to determine context tree data based on the one or more context filters and the data model entry point from any context tree provider that has appropriate context tree information. The memory is coupled to the processor and is configured to provide the processor with instructions.

19 Claims, 9 Drawing Sheets

Related U.S. Application Data continuation of application No. 15/221,426, filed on Jul. 27, 2016, now Pat. No. 10,331,643, which is a continuation of application No. 13/626,199, filed on Sep. 25, 2012, now Pat. No. 9,430,548.

(51) Int. Cl.
  *G06F 16/242* (2019.01)
  *G06F 16/245* (2019.01)
  *G06F 16/28* (2019.01)

(52) U.S. Cl.
  CPC ............ *G06F 16/245* (2019.01); *G06F 16/28* (2019.01); *G06F 16/288* (2019.01)

(58) Field of Classification Search
  USPC ........................................................ 707/695
  See application file for complete search history.

(56) References Cited

U.S. PATENT DOCUMENTS

| | | | | |
|---|---|---|---|---|
| 7,167,862 | B2* | 1/2007 | Mullins | G06F 9/4493 |
| 7,818,714 | B2* | 10/2010 | Ryan | G06F 8/10 |
| | | | | 717/114 |
| 7,844,640 | B2* | 11/2010 | Bender | G06F 9/451 |
| | | | | 707/810 |
| 2006/0247936 | A1* | 11/2006 | Khusial | G06Q 30/0201 |
| | | | | 705/7.29 |
| 2008/0183744 | A1* | 7/2008 | Adendorff | G06Q 10/10 |
| | | | | 707/999.102 |
| 2009/0063213 | A1* | 3/2009 | Benayon | G06Q 10/06 |
| | | | | 705/7.11 |
| 2009/0138940 | A1* | 5/2009 | Liu | H04L 41/0894 |
| | | | | 726/1 |
| 2010/0088676 | A1* | 4/2010 | Yuan | G06F 16/80 |
| | | | | 707/E17.005 |
| 2010/0332548 | A1* | 12/2010 | Gibson | G06F 16/289 |
| | | | | 717/106 |
| 2013/0073504 | A1* | 3/2013 | Mohindra | G06N 5/02 |
| | | | | 706/46 |

* cited by examiner

GENERATING CONTEXT TREE DATA BASED ON A TAILORED DATA MODEL

CROSS-REFERENCE TO RELATED APPLICATIONS

This application is a continuation of, and claims a benefit of priority under 35 U.S.C. 120 of the filing date of U.S. patent application Ser. No. 16/418,479, filed May 21, 2019, issued as U.S. Pat. No. 11,567,918, entitled "GENERATING CONTEXT TREE DATA BASED ON A TAILORED DATA MODEL," which is a continuation of, and claims a benefit of priority under 35 U.S.C. 120 of the filing date of U.S. patent application Ser. No. 15/221,426, filed Jul. 27, 2016, issued as U.S. Pat. No. 10,331,643, entitled "GENERATING CONTEXT TREE DATA BASED ON A TAILORED DATA MODEL," which is a continuation of, and claims a benefit of priority under 35 U.S.C. 120 of the filing date of U.S. patent application Ser. No. 13/626,199, filed Sep. 25, 2012, issued as U.S. Pat. No. 9,430,548, entitled "GENERATING CONTEXT TREE DATA BASED ON A TAILORED DATA MODEL", the entire contents of which are hereby expressly incorporated by reference for all purposes.

BACKGROUND OF THE INVENTION

In a typical system, a consumer of the data model has to be aware of each and every aspect and manifestation of the data model based on the context of where and how the data models are used. The builder and run time consumer also need to know how to construct or interpret any data interchange schema. Further, a runtime consumer or client has to know how to find the values for any data referred to by a data model.

BRIEF DESCRIPTION OF THE DRAWINGS

Various embodiments of the invention are disclosed in the following detailed description and the accompanying drawings.

DETAILED DESCRIPTION

Figure 1A:
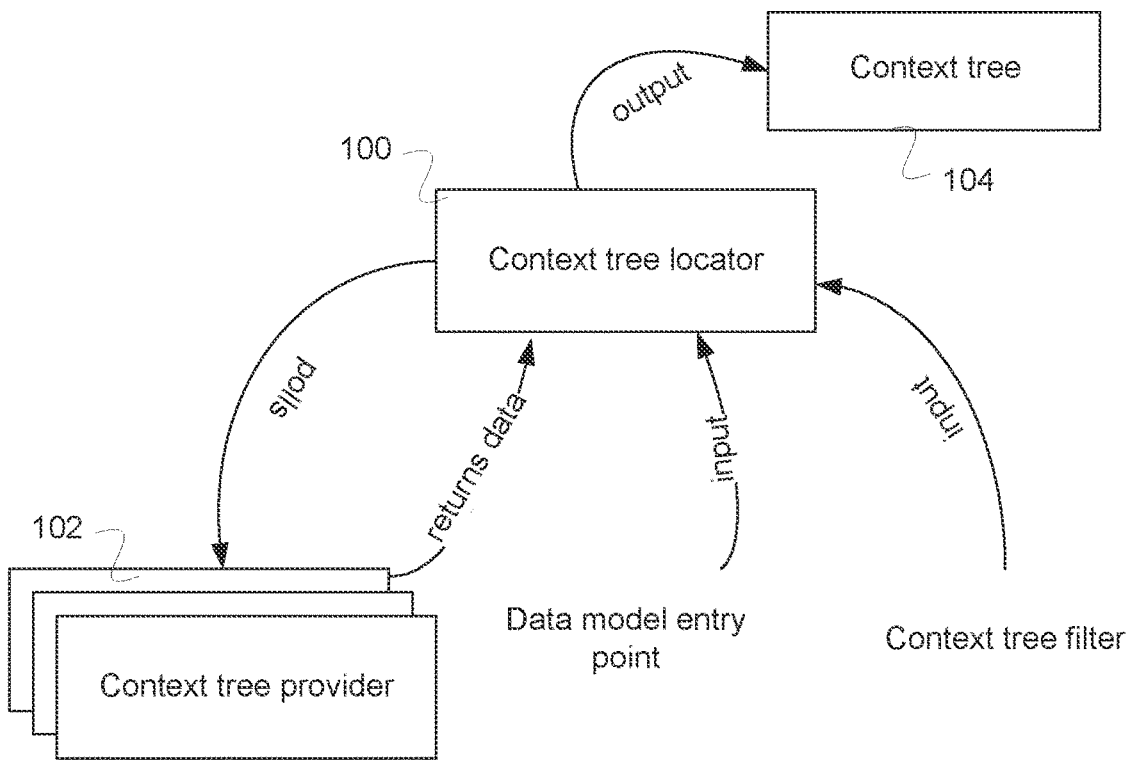
FIG. 1A is a block diagram illustrating an embodiment of a context tree locator.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for providing data model based context tree is disclosed. The system comprises an interface, a processor, and a memory. The interface (e.g., a context tree locator) is configured to receive a data model entry point, and to receive one or more context filters. The processor (e.g., a context tree provider) is configured to determine context tree data based on the one or more context filters and the data model entry point from any context tree provider that has appropriate context tree information. The memory is coupled to the processor and is configured to provide the processor with instructions.

In some embodiments, a context tree provider and the logic to construct a context tree are abstracted, so that a consumer can access a tailored context tree based on the data model. The appropriate data can thereby be used by any client or consumer via this tailored context tree. A context data provider could be used where appropriate to provide actual data values for any given instance of a context tree, and therefore each consumer does not need to be aware of how the values are retrieved. The validation framework that validates the expressions based on the context tree remains unchanged even with the introduction of newer data models.

FIG. 1A is a block diagram illustrating an embodiment of a context tree locator. In the example shown, context tree locator 100 receives a data model entry point and a context tree filter. Context tree locator 100 polls a plurality of context tree providers 102 to see if any context tree providers 102 have any data contributions for context tree 104. The data contributions for context tree 104 are based at least in part on the data model and the context tree filter. After context tree 104 is populated with nodes from context tree providers 102, context tree 104 is provided as an output from context tree locator 100. In some embodiments, a builder is used to build an expression that requires data of a type to be used—for example, an expression of an application or service of a software system is built using context tree 104. Context tree 104 is built based at least in part on a data model and a context tree filter, where the context tree filter indicates a tailored version of the data model for the context tree that is consumed or produced by the expression. In various embodiments, the tailored version of the data model—for example, an instance of a context tree—is tailored for the expression by the context tree filter (e.g., a context tree that removes elements of the data model, includes all elements of a data model, includes referred to or linked to elements of other data models, etc.). A data model entry point is indicated that corresponds to the data of the type. In some embodiments, more than one context tree filters are submitted as input. In some embodiments, filters are order and a higher order filter takes precedence in the event of a conflict.

In some embodiments, when additional builds for expressions require additional filters, a context tree filter is added appropriate for a new context. In some embodiments, when the context tree filter is added a corresponding context tree provider is added to provide data contributions appropriate for the added context tree filter and associated data model.

In some embodiments, builder time and run time know the data model and the context in which it is being used. The expressions constructed based on context tree are evaluated during runtime which also understands the data model and the context. In some embodiments, the context tree provider is an abstraction for each implementation to provide their contribution to the context tree structure based on the data model and context tree filter. In some embodiments, a validation framework understands the context tree and has inherent capability to validate the expressions based on the context tree. In some embodiments, the context tree enables a mechanism and abstraction between the data model and the consumers of the data model during both build time and run time, and provides a data exchange schema for various participants.

Figure 1B:
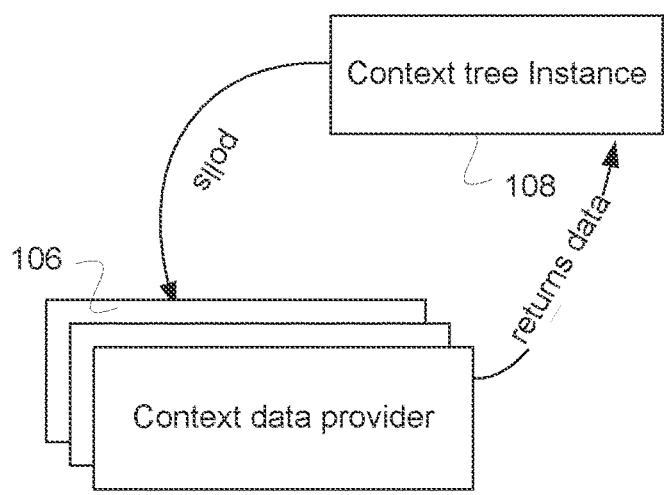
FIG. 1B is a block diagram illustrating an embodiment of populating a context tree instance.

FIG. 1B is a block diagram illustrating an embodiment of populating a context tree instance. In the example shown, context tree instance 108 (e.g., an expression generated instance of a context tree) is referred to by a runtime system. Context tree instance 108 populates the data fields of the instance by polling context data providers 106. Context data providers 106 provide data to populate context tree instance 108 by retrieving data from a memory or repository as indicated by the context tree instance. For example, a context data provider (e.g., one of context data providers 106) understands a context tree (e.g., context tree instance 108) and the context and know how to fetch the data.

Figure 2A:
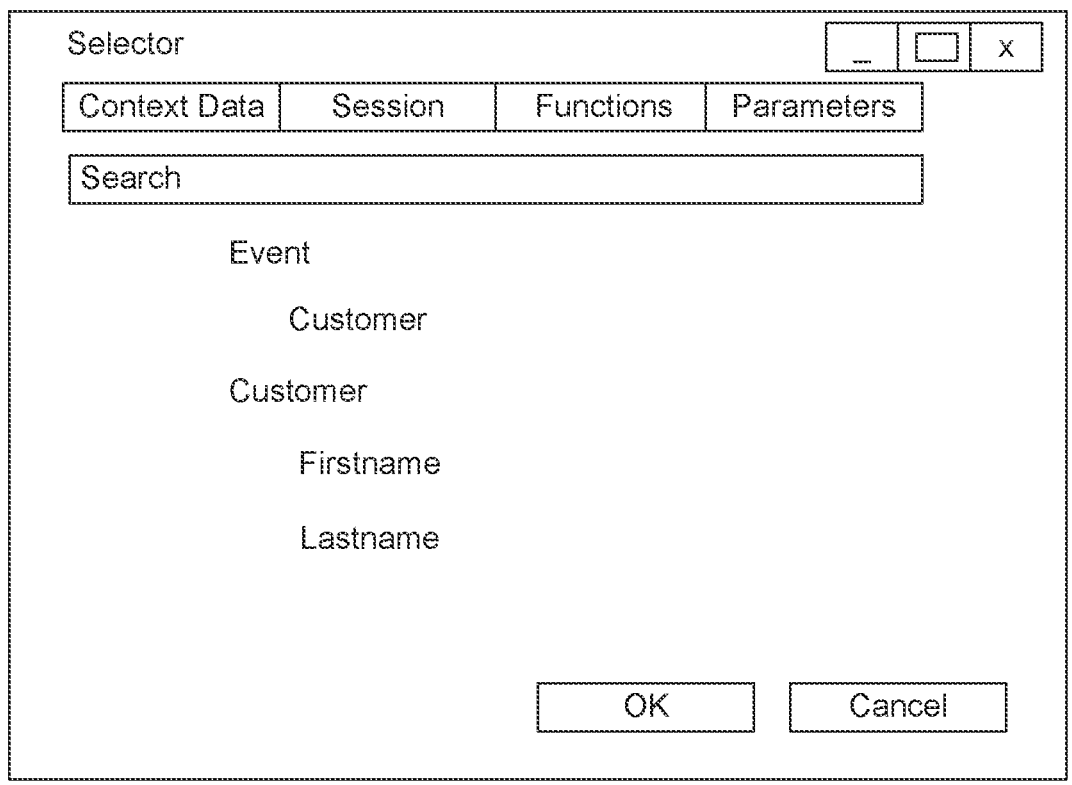
FIGS. 2A and 2B are block diagrams illustrating embodiments of context trees.
Figure 2B:
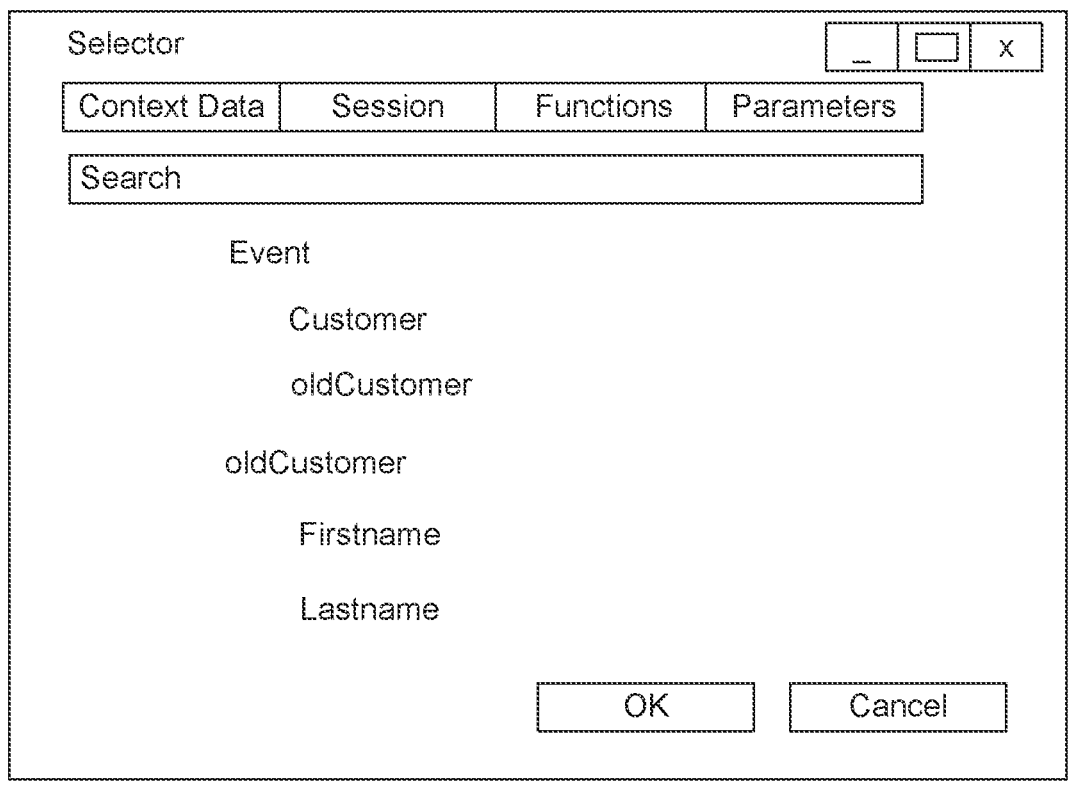

FIGS. 2A and 2B are block diagrams illustrating embodiments of context trees. In the example shown in FIG. 2A, business object "Customer" has two attributes "firstname" and "lastname". If the context tree filter is "customer created event", then the context tree is as shown in FIG. 2A. In the example shown in FIG. 2B, business object "Customer" has two attributes "firstname" and "lastname". In some embodiments, the context tree filter indicates that the context tree include the two attributes of the object. If the context tree filter is "customer updated", then the context tree is as shown in FIG. 2B. In some embodiments, the context tree filter indicates that the context tree includes a set of the two attributes of the updated object (e.g., customer first name and last name) and a copy of the previous object (e.g., customer previous first name and previous last name). The nodes for both customer and oldcustomer are available and visible, where oldcustomer has the old values of the customer before the update has occurred. Any expressions created from the context—for example, "event.old_customer.firstname=='Joe'" will be understood during runtime by the expression validation and evaluation. In some embodiments, the validation framework looks at the expression and sees if it complies with the context tree hierarchy (e.g., the context tree includes the previous first name and previous last name—such as "event.old_customer.firstname" and "event.old_customer.lastname", but is not based on the "customer updated" context tree filter—the validation will fail). In some embodiments, the validation framework determines whether the expression is consistent with the context tree; in the event that the expression and context tree are not consistent, then the validation framework indicates that the expression is not consistent with the context tree (e.g., validation fails); in the event that the expression and the context tree are consistent, then the validation framework indicates that the expression is consistent with the context tree (e.g., validation passes). In the event that the validation has failed (or has been indicated an inconsistency), then the expression is indicated to have a flaw and is not allowed to execute. In the event that the validation has passed (or has been indicated to be consistent), then the expression is indicated to not be flawed for the consistency check with the context tree and is allowed to execute.

Figure 3A:
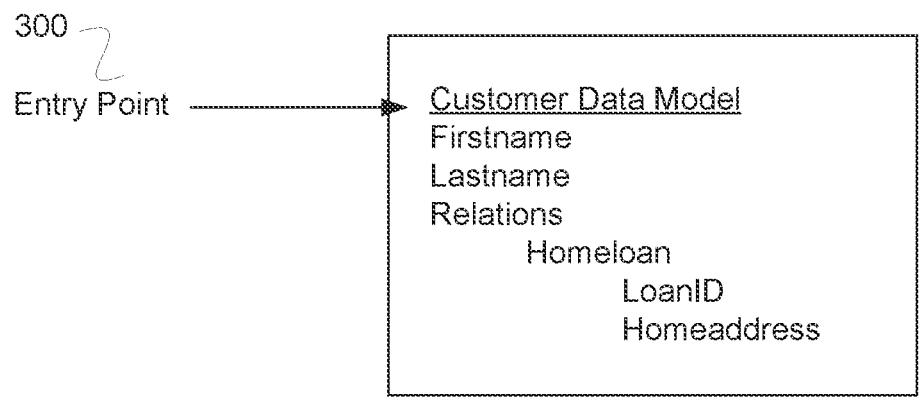
FIG. 3A is a block diagram illustrating an embodiment of a data model.

FIG. 3A is a block diagram illustrating an embodiment of a data model. In the example shown, the data model is a customer data model that includes data fields "Firstname" and "Lastname". It also includes a relation to "Homeloan". Homeloan has data fields that include "LoanID" and "Homeaddress". In some embodiments, the Homeloan is a data model and the data fields are specified in the Homeloan data model. In some embodiments, the relation in a data model is a link or reference to another data model. In some embodiments, there are links or references to other data models. In some embodiments, a data model includes other relation like links that are specific to those data models. Also, a data model entry point 300 is shown to the data model (e.g., a pointer or other indicator enabling access to a data model).

Figure 3B:
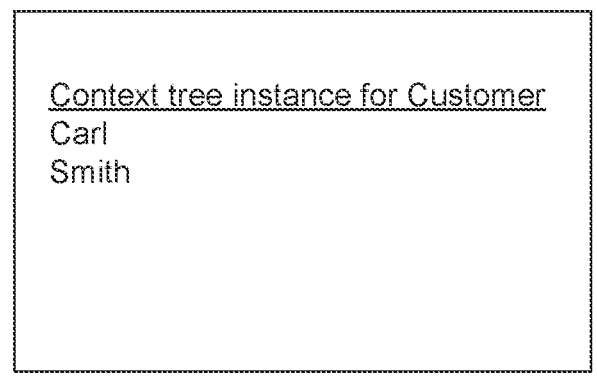
FIG. 3B is a block diagram illustrating an embodiment of a context tree instance.

FIG. 3B is a block diagram illustrating an embodiment of a context tree instance. In the example shown, context tree instance for customer shows only the data fields. In this case, as an example, a context tree locator was called with inputs of a data model entry point (e.g., entry point 300 of FIG. 3A) and a context tree filter. The context tree filter indicates that the context tree should include only the data fields "Firstname" and "Lastname"—Carl and Smith, respectively. The context tree instance data was populated by context data providers appropriately populating data fields of the instance.

Figure 4A:
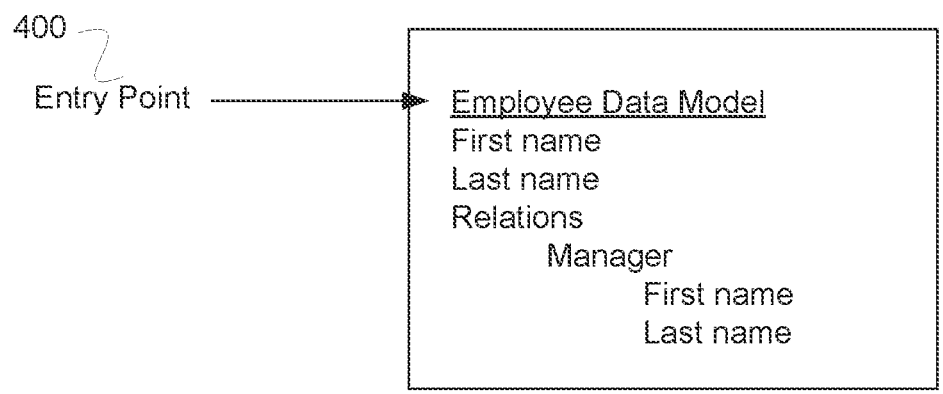
FIG. 4A is a block diagram illustrating an embodiment of a data model.

FIG. 4A is a block diagram illustrating an embodiment of a data model. In the example shown, the data model is an employee data model that includes data fields "First name" and "Last name" and relations to "Manager". "Manager" includes data fields of "First name" and "Last name". Also shown is employee data model entry point, entry point 400.

Figure 4B:
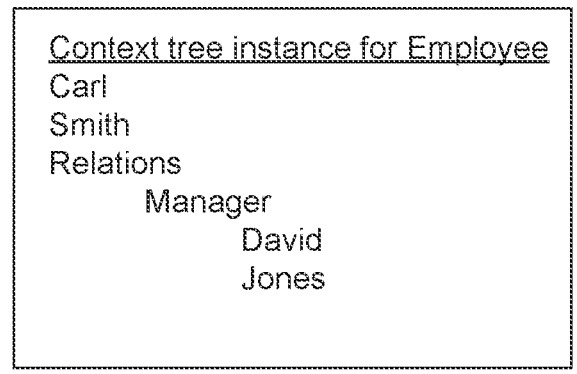
FIG. 4B is a block diagram illustrating an embodiment of a context tree instance.

FIG. 4B is a block diagram illustrating an embodiment of a context tree instance. In the example shown, context tree instance for employee shows data fields and relations. In this case, as an example, a context tree locator was called with inputs of a data model entry point (e.g., entry point 400 of FIG. 4A) and a context tree filter. The context tree filter indicates that the context tree should include the data fields "Firstname" and "Lastname"—Carl and Smith, respectively—and relations manager "David" and "Jones". The context tree instance data was populated by context data providers appropriately populating data fields of the instance. Notice that in this case, a manager is also an employee. So, the context tree instance can be configured (e.g., by the context tree filter, by the expression, by the process, etc.) to show, in various embodiments, no relations, a first level of relations, a second level of relations, or n-levels of relations, up to the end of the relations, levels on request (e.g., from the process or expression), or any other appropriate levels. In various embodiments, links or references to other data models are not followed by context data providers, are followed to a first level of link or reference to populate a context tree instance, are followed to a second level of link or reference, are followed to n-levels of link or reference to populate a context tree instance, are up to an end of links or references, up to a requested level of links or references, or any other appropriate level.

Figure 4C:
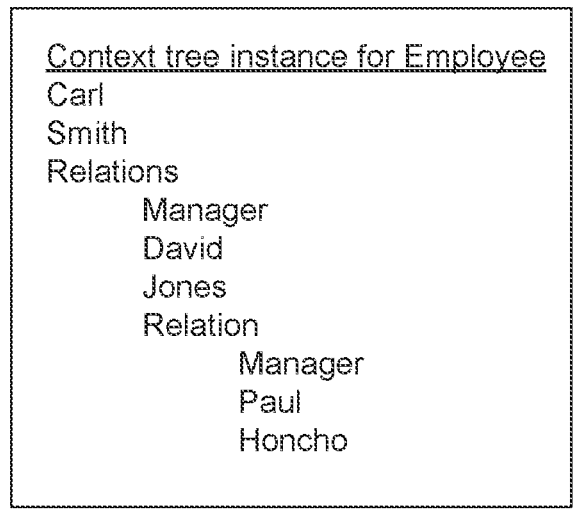
FIG. 4C is a block diagram illustrating an embodiment of a context tree instance.

FIG. 4C is a block diagram illustrating an embodiment of a context tree instance. In the example shown, context tree instance for employee shows data fields and relations. In this case, as an example, a context tree locator was called with inputs of a data model entry point (e.g., entry point 400 of FIG. 4A) and a context tree filter. The context tree filter indicates that the context tree should include the data fields "Firstname" and "Lastname"—Carl and Smith, respectively—and relations manager "David" and "Jones", and relations manager of the manager "Paul" and "Honcho".

Figure 5:
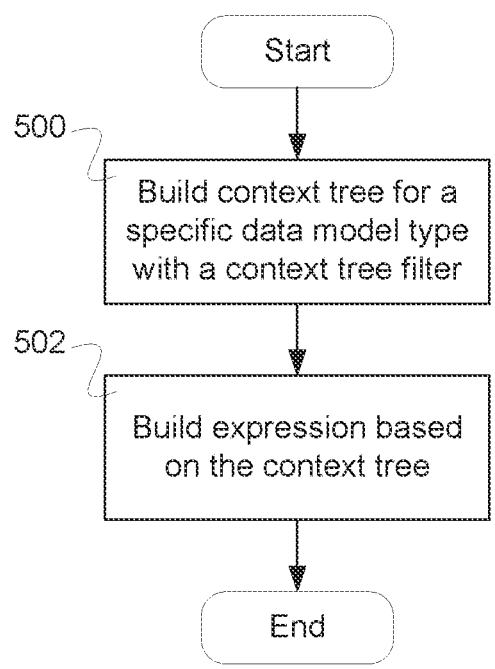
FIG. 5 is a flow diagram illustrating an embodiment of a process for utilizing a context tree.

FIG. 5 is a flow diagram illustrating an embodiment of a process for utilizing a context tree. In the example shown, in 500 a context tree is built for a specific data model type with a context tree filter. For example, a context tree is built for a specific data model type with a specific filter (e.g., a context tree for "customer" is built with filter "customer updated"). In 502, an expression is built based on the context tree is evaluated using context tree data providers. For example, a context tree instance is generated and populated.

Figure 6:
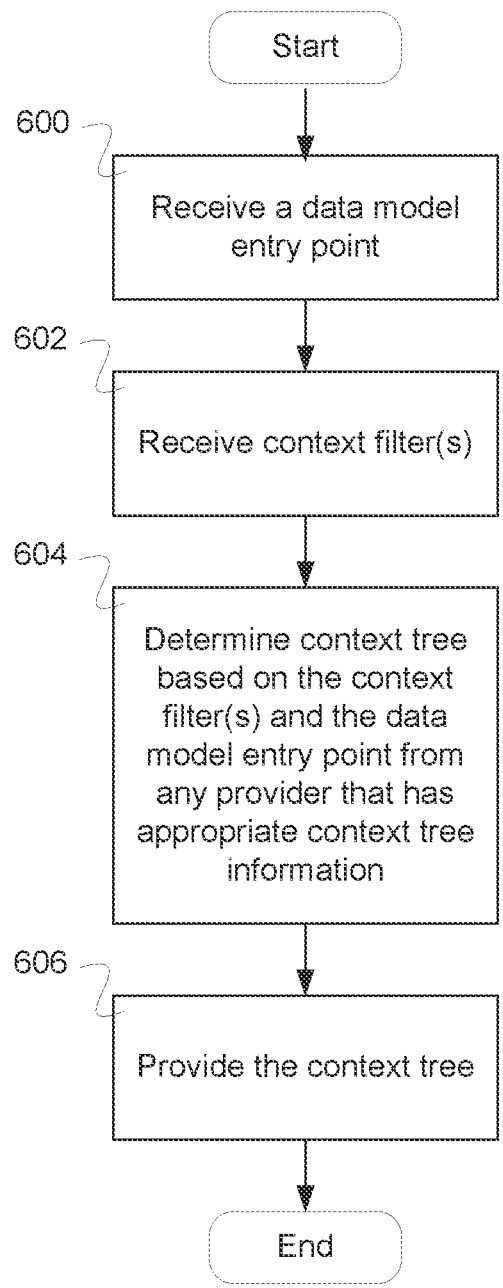
FIG. 6 is a flow diagram illustrating an embodiment of a process for building a context tree.

FIG. 6 is a flow diagram illustrating an embodiment of a process for building a context tree. In some embodiments, the process of FIG. 6 is used to implement 500 of FIG. 5. In the example shown, a data model entry point is received. For example, the data model entry point is received via an interface. In 602, context filter(s) is/are received. For example, the context filter(s) is/are received via an interface. In 604, context tree is determined based on the context filter(s) and the data model entry point from any provider that has appropriate context tree information. For example, the provider is a context tree provider. In 606, the context tree is provided. For example, the context tree is provided via an interface.

Figure 7:
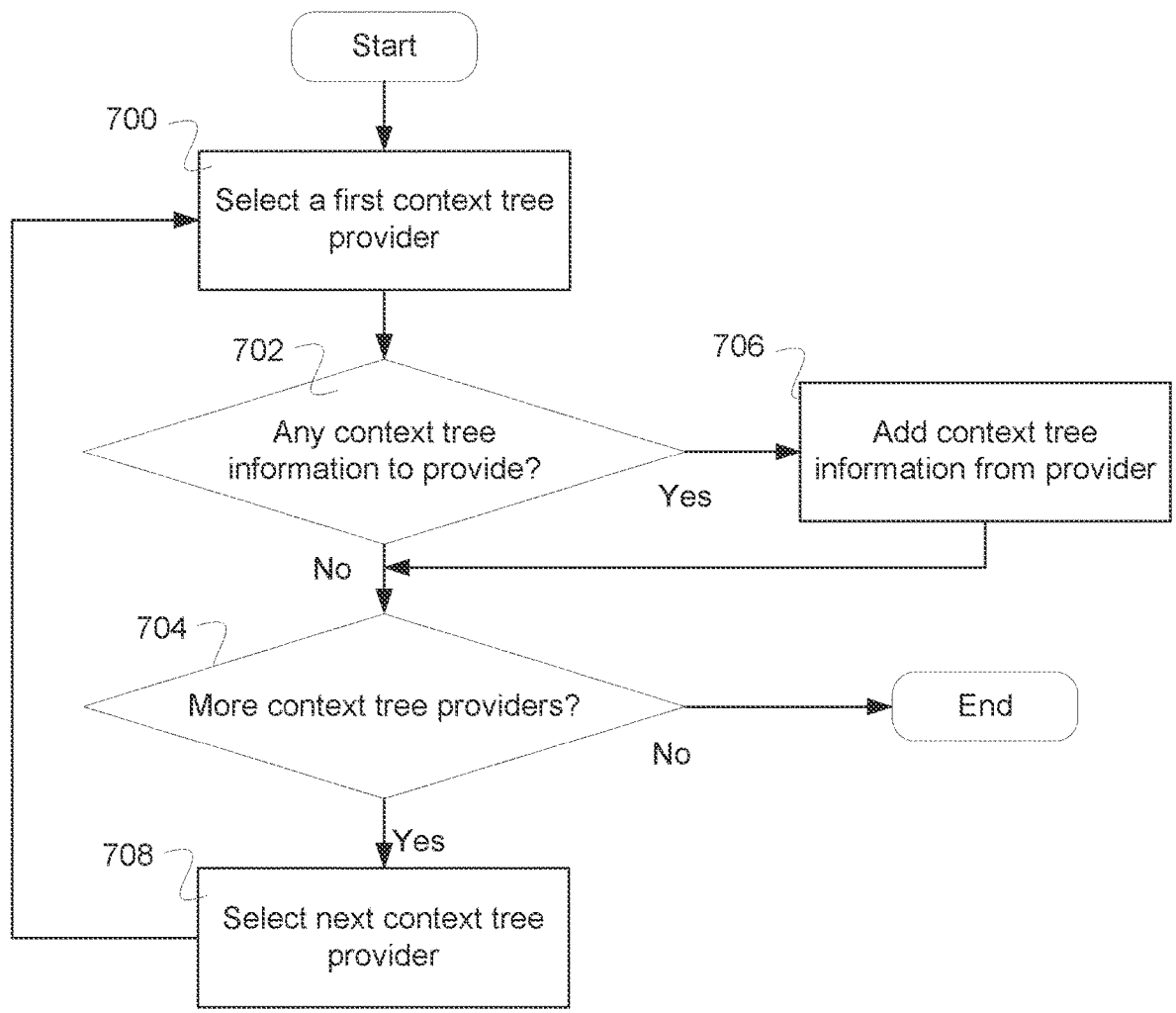
FIG. 7 is a flow diagram illustrating an embodiment of a process for determining context tree data.

FIG. 7 is a flow diagram illustrating an embodiment of a process for determining context tree data. In some embodiments, the process of FIG. 7 is used to implement 604 of FIG. 6. In the example shown, in 700 a first context tree provider is selected. In 702, it is determined whether there is any context tree information to provide. In the event that there is any context tree information to provide, in 706 context tree information from the provider is added and control passes to 704. In the event that there is not any context tree information to provide, in 704 it is determined whether there are more context tree providers. In the event that there are not any more context tree providers, the process ends. In the event that there are more context tree providers, a next contact tree provider is selected and control passes to 700.

Figure 8:
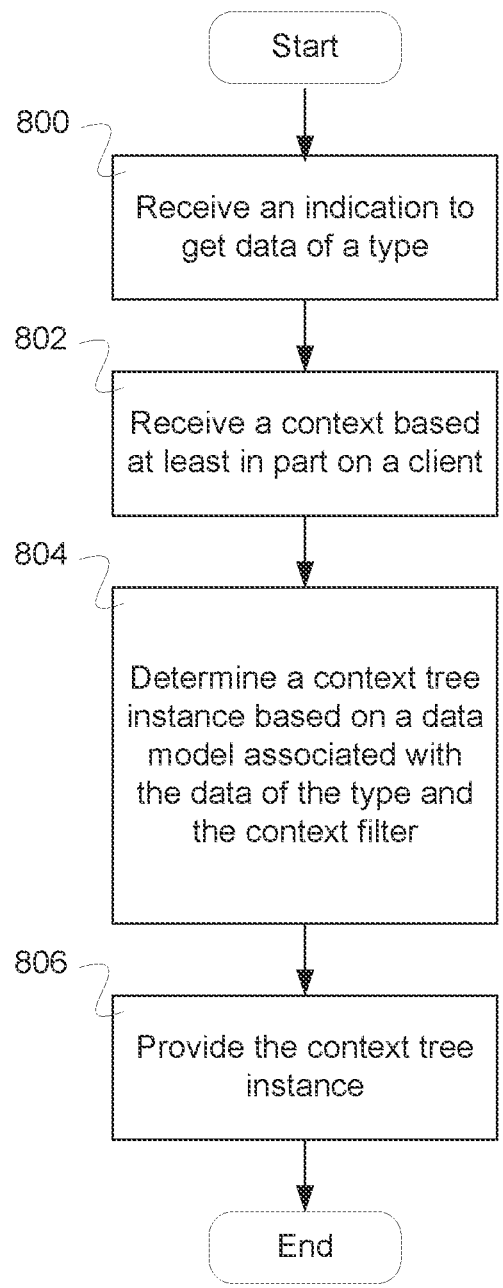
FIG. 8 is a flow diagram illustrating an embodiment of a process for using a context tree during run time.

FIG. 8 is a flow diagram illustrating an embodiment of a process for using a context tree during run time. In some embodiments, the process of FIG. 8 is used to implement 502 of FIG. 5. In the example shown, in 800 an indication is received to get data of a type. For example, an indication is received based on an expression built on the context tree. In 802, a context is received based at least in part on a client. In 804, a context tree instance is determined based on a data model associated with the data of the type and the context filter. In 806, the context tree instance is provided.

Figure 9:
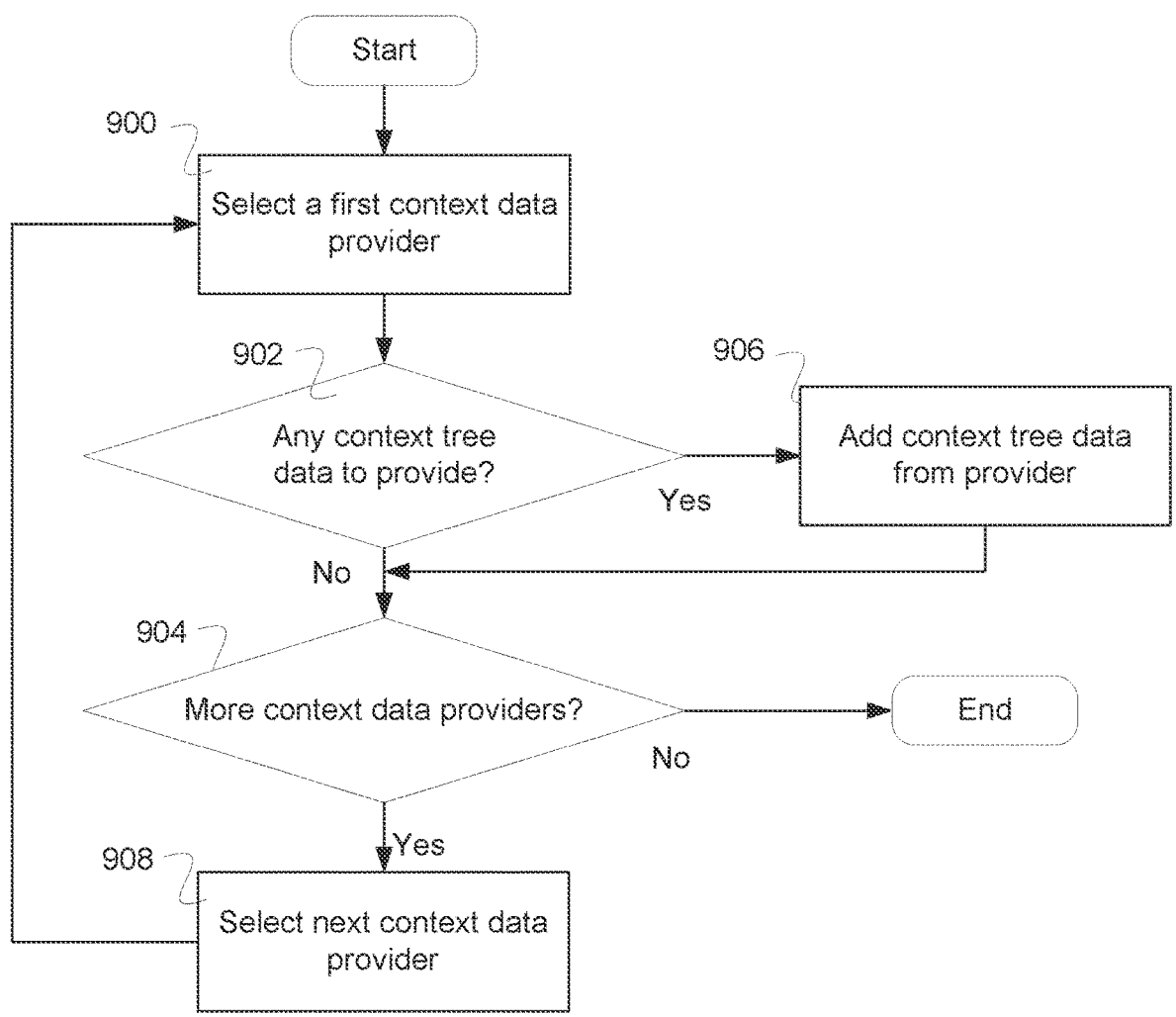
FIG. 9 is a flow diagram illustrating an embodiment of a process for determining a context tree instance.

FIG. 9 is a flow diagram illustrating an embodiment of a process for determining a context tree instance. In some embodiments, the process of FIG. 9 is used to implement 804 of FIG. 8. In the example shown, in 900 a first context data provider is selected. In 902, it is determined whether there is any context tree data to provide. In the event that there is context data to provide, then in 906 context tree data is added from the provider. For example, the context tree data fields are filled with values received from the provider. Control passes to 904. In the event that there is no context data to provide, then in 904 it is determined whether there are more context data providers. In the event that there are no more context data providers, then the process ends. In the event that there are more context data providers, then in 908 select a next context data providers.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A system for providing context tree data, comprising:
   one or more hardware processors coupled to a memory containing instructions which when executed by the one or more hardware processors cause the one or more hardware processors to:
   receive a data model entry point which indicates a first data model that includes one or more data types required by an expression or process;
   receive at least one context filter which is configured to modify one or more elements of the first data model to provide a second data model that is different from the first data model;
   receive data contributions from one or more context tree providers;
   generate, using the at least one context filter and the one or more data types from the data model entry point, a context tree instance populated with the data contributions, wherein the generated context tree instance uses the second data model;
   provide the generated context tree instance to the expression or process.

2. The system of claim 1, wherein the instructions when executed by the one or more hardware processors cause the one or more hardware processors to further poll a plurality of context tree providers to determine if any of the context tree providers have any contributions of context tree data.

3. The system of claim 2, wherein polling the plurality of context tree providers comprises:
   select a first context tree provider;
   determine whether the first context tree provider has context tree data consistent with the second data model;
   in the event there is context tree data to provide from the first context tree provider, add data from the first context tree provider to corresponding context tree data fields; and in the event there is no context tree data to provide from the first context tree provider, select a next context tree provider.

4. The system of claim 3, wherein selecting the first context tree provider comprises selecting one of the plurality of context tree providers that uses a data model that is consistent with the second data model.

5. The system of claim 1, wherein at least one context data provider follows a link or a reference to another data model associated with the generated context tree instance.

6. The system of claim 1, wherein at least one context data provider follows n-levels of links or references to other data models associated with the generated context tree instance.

7. The system of claim 1, wherein the expression is generated using a builder.

8. The system of claim 7, wherein the process or the expression is executed using the generated context tree instance.

9. The system of claim 1, wherein a context tree corresponding to the context tree data includes at least one attribute data field.

10. The system of claim 1, wherein a context tree corresponding to the context tree data includes at least one relation data field.

11. The system of claim 1, wherein generating the context tree instance includes omitting from the context tree instance one or more elements that are in the first data model as indicated by the second data model, and wherein the one or more omitted elements include attributes or relations from the first data model.

12. The system of claim 1, wherein generating the context tree instance includes including in the context tree instance one or more elements that are not in the first data model as indicated by the second data model, and wherein the one or more included elements include attributes or relations from other data models that are referred to or linked to by the first data model.

13. The system of claim 1, wherein the one or more hardware processors are further configured to validate an expression based at least in part on the context tree data.

14. The system of claim 13, wherein validating the expression comprises determining whether the expression is consistent with the context tree data.

15. The system of claim 14, wherein in the event that the expression is not consistent with the context tree data, an indication is provided that the validation fails, and wherein in the event that the expression is consistent with the context tree data, an indication is provided that the validation passes.

16. The system of claim 14, wherein the determining whether the expression is consistent with the context tree data comprises determining whether the expression complies with a context tree hierarchy.

17. The system of claim 1, wherein the context tree data comprises data from a plurality of levels of a context tree hierarchy based on one or more relations among data from the plurality of levels of the context tree hierarchy.

18. A method of providing context tree data, comprising:
receiving a data model entry point which indicates a first data model that includes one or more data types required by an expression or process;
receiving at least one context filter which is configured to modify one or more elements of the first data model to provide a second data model that is different from the first data model;
receiving data contributions from one or more context tree providers;
generating, using the at least one context filter and the one or more data types from the data model entry point, a context tree instance populated with the data contributions, wherein the generated context tree instance uses the second data model;
providing the generated context tree instance to the expression or process.

19. A non-transitory computer-readable storage medium storing instructions corresponding to computer program product for providing context tree data, wherein in the event that the instructions are executed by one or more hardware processors, the instructions cause the one or more hardware processors to:
receive a data model entry point which indicates a first data model that includes one or more data types required by an expression or process;
receive at least one context filter which is configured to modify one or more elements of the first data model to provide a second data model that is different from the first data model;
receive data contributions from one or more context tree providers;
generate, using the at least one context filter and the one or more data types from the data model entry point, a context tree instance populated with the data contributions, wherein the generated context tree instance uses the second data model;
provide the generated context tree instance to the expression or process.

* * * * *